United States Patent [19]

Sato et al.

[11] 4,223,657

[45] Sep. 23, 1980

[54] SAFETY DEVICE FOR CONTROLLING AN IGNITION CIRCUIT

[75] Inventors: Hiroo Sato, Susono; Yoshihiko Ikeda, Shizuoka; Mitsuo Katsumata, Susono, all of Japan

[73] Assignee: Kokusan Kenki Co., Ltd., Numazu, Japan

[21] Appl. No.: 884,649

[22] Filed: Mar. 8, 1978

[30] Foreign Application Priority Data

Mar. 14, 1977 [JP] Japan .............................. 52-30720[U]

[51] Int. Cl.[3] ........................ F02N 15/10; B60K 41/04

[52] U.S. Cl. .................................. 123/179 K; 74/850; 123/198 D

[58] Field of Search ........ 123/179 BG, 179 K, 148 S, 123/198 D; 74/850, 878, 843

[56] References Cited

U.S. PATENT DOCUMENTS

| | | | |
|---|---|---|---|
| 3,521,612 | 7/1970 | Santi et al. | 123/179 BG |
| 3,718,128 | 2/1973 | Botker | 123/179 K |
| 3,726,265 | 4/1973 | Howard | 123/179 K |
| 3,827,540 | 8/1974 | Bolinger et al. | 74/850 X |
| 4,033,311 | 7/1977 | Burson | 123/179 K |
| 4,172,394 | 10/1979 | Kudo et al. | 123/179 K X |

*Primary Examiner*—Tony M. Argenbright
*Attorney, Agent, or Firm*—Pearne, Gordon, Sessions

[57] ABSTRACT

A safety device for controlling an ignition circuit for an internal combustion engine associated with a transmission coupling the engine to a load comprises a thyristor adapted to permit, upon conduction thereof, the ignition circuit to produce a high voltage to fire a spark plug provided in the engine, a position-responsive switch adapted to permit application of a trigger signal from a power supply to the gate of the thyristor only when the transmission is in neutral, and a capacitor coupled across the gate and cathode of the thyristor to be charged by a voltage drop thereacross and to provide a trigger signal to the gate of the thyristor. Once the capacitor is charged it maintains a condition wherein the thyristor is turned on whenever the thyristor is positively biased even after the transmission is in gear. Thus the safety device disables the ignition circuit to prevent the engine from starting with the transmission in gear, but once the engine is started the transmission can be shifted into gear without disabling the ignition circuit.

9 Claims, 7 Drawing Figures

SAFETY DEVICE FOR CONTROLLING AN IGNITION CIRCUIT

BACKGROUND OF THE INVENTION

The present invention relates to a safety device for controlling an ignition circuit for an internal combustion engine associated with a transmission coupling the engine to a load.

Internal combustion engines adapted to certain applications should not be started unless the transmission coupling the engine to a load is in neutral. For instance, if an engine for use as an outboard motor or an inboard motor is started with the transmission in gear, the boat begins to move immediately upon the start of the engine, with potential danger that the operator of the boat may fall into the water or the boat may run into another boat which may happen to be in the way of the first mentioned boat which has begun to move.

It has been suggested to provide a safety device to control the starting of the engine, so that the engine is not started unless the transmission is in neutral. This conventional safety device includes a thyristor adapted to be conductive to short the primary winding to prevent ignition. Before the engine is started, the thyristor is kept nonconductive provided that the transmission is in neutral. With the thyristor being nonconductive, ignition can be effected to start the engine. Once the engine is started, the transmission can be shifted into gear without rendering the thyristor conductive, by a function of a memory circuit, which includes a series circuit of a capacitor and a resistor to effectively memorize that the engine has been duly started so that it is no longer necessary to prevent ignition even if the transmission is in gear.

A disadvantage of the conventional safety device resides in that the series circuit of the capacitor and the resistor of the memory circuit is connected across the primary winding. When the thyristor is nonconductive and the ignition is effected, the series connection of the capacitor and the resistor across the primary winding prolongs the rise time of the secondary voltage of the ignition coil and decreases the magnitude of the secondary voltage.

SUMMARY OF THE INVENTION

An object of the present invention is to provide a safety device which does not adversely affect the operation the ignition coil of producing a high voltage with a short rise time to fire the spark plug.

A safety device according to the invention is for use with an ignition circuit including at least one ignition coil having a primary and a secondary windings to produce a high voltage to fire a spark plug. The ignition circuit may be of a type wherein a capacitor is charged, and is subsequently discharged through the primary winding. The ignition circuit may alternatively of a type wherein a switching device is connected in series with the primary winding to periodically switch on and off the primary current. The safety device of the present invention is applicable to any other types of ignition circuits.

A power supply is provided to energize the ignition circuit. The power supply may comprise at least one generating winding provided in an AC generator coupled to the shaft of the engine. It may be that the primary winding of the ignition coil is provided in an AC generator to serve also as the power supply. The power supply may alternatively comprise a battery.

The safety device of the invention comprises a power supply, which may be the one which also serves as the power supply of the ignition circuit. The power supply of the safety device may therefore comprise a generating winding in an AC generator coupled to the engine, or it may comprise a battery.

The safety device of the invention comprises a thyristor adapted to permit the ignition circuit to produce a high voltage only when the thyristor is conductive. The thyristor may be connected to render at least one of the circuit components which contribute to the production of the high voltage. The thyristor itself may directly render ineffective the circuit component, or there may be provided a second thyristor which may be controlled by the first thyristor to render ineffective the circuit component.

The safety device also includes a position-responsive switch adapted to permit application of a trigger signal from the power supply to the gate the thyristor thereby enabling conduction of the thyristor only when the transmission is in neutral. The position-responsive switch may be in the form of a reed switch operated when a magnet or any one of other magnetic flux sources is approached, or it may alternatively comprise a mechanically-operated limit switch actuated by physical engagement. The position-responsive switch may be designed to be closed to couple the gate of the thyristor to the power supply only when the transmission is in neutral. Therefore, the position-responsive switch enables initial conduction of the thyristor and hence the starting of the engine on condition that the transmission is in neutral.

Coupled across the gate and the cathode of the thyristor is a capacitor. This capacitor is charged by a voltage drop across the gate and the cathode of the first thyristor, such a voltage drop being developed when the thyristor is conducting. The capacitor at the same time provides a trigger signal to the gate of the thyristor. Once the capacitor is charged, a condition is maintained wherein the thyristor is turned on whenever it is positively biased. If an AC voltage is applied across the anode and the cathode of the thyristor, at least part of the charge on the capacitor is discharged to trigger the thyristor and the resultant conduction of the thyristor recharges the capacitor to be ready for subsequent triggering. Accordingly the ignition circuit is not prevented from producing the high voltage once the capacitor is charged, even after the transmission is shifted into gear. The capacitor is discharged to a voltage insufficient to trigger the thyristor, when the engine is stopped and conduction of the thyristor is not effected over a certain time interval.

The capacitor for maintaining a condition wherein the thyristor is turned on whenever it is positively biased is coupled across the gate and the cathode of the thyristor and does not provide a path across the primary winding. Therefore the capacitor does not adversely affect the operation of the ignition coil.

BRIEF DESCRIPTION OF THE DRAWINGS

Other features and advantages of the present invention will be apparent from the following detailed description of the preferred embodiments, taken in conjunction with the accompanying drawings, in which.

DETAILED DESCRIPTION OF THE PREFERRED EMBODIMENTS

Figure 1:
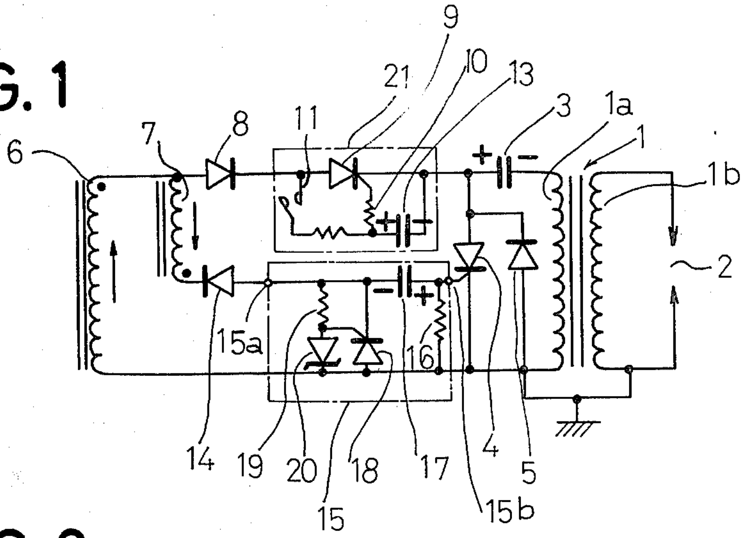
FIGS. 1 through 6 respectively show various embodiments of the safety device according to the invention, associated with various types of ignition circuits.

Referring now more particularly to FIG. 1, there is shown an embodiment of the safety device according to the invention, associated with a capacitor-discharge ignition circuit.

The ignition circuit includes an ignition coil 1 having a primary winding 1*a* and a secondary winding 1*b*. Connected across the secondary winding 1*b* is a spark plug 2, which is provided in an engine associated with a transmission for coupling the engine to a load. A first end of the primary winding 1*a* and a first end of the secondary winding 1*b* are both grounded.

A capacitor 3 is connected in series with the primary winding 1*a*, with a first terminal of the capacitor 3 being connected to the second end of the primary winding 1*a*. A thyristor 4 is connected across the series circuit formed of the capacitor 3 and the primary winding 1*a*. More specifically, the anode of the thyristor 4 is connected to the second terminal of the capacitor 3 and the cathode of the thyristor 4 is grounded. The thyristor 4 serves to discharge, upon conduction thereof, the capacitor 3 through the primary winding 1*a*. A diode 5 has its cathode connected to the anode of the thyristor 4 and has its anode grounded. The discharge control circuit comprises the capacitor 3 and thyristor 4.

An exciter coil 6 and a signal coil 7 are provided in a magneto AC generator which is coupled to the shaft of the engine. The shaft of the engine is rotated when the engine operates. The shaft of the engine can also be rotated by a starting device, which may be a manually-operated starting device, such as a starting rope. The starting device is used for causing the generator to produce a voltage. The exciter coil 6 serves as the power supply of the ignition circuit and also as the power supply of the safety device.

The exciter coil 6 and the signal 7 are so adapted that during the period when the exciter coil 6 produces a positive output indicated by an arrow beside the coil 6 in the drawing, the signal coil 7 produces a positive output indicated by an arrow beside the coil 7.

A first terminal of the exciter coil 6 is grounded and a second terminal of the exciter coil 6 is connected to the anode of a diode 8, whose cathode is connected to the anode of a thyristor 9. The cathode of the thyristor 9 is connected to the second terminal of the capacitor 3. The gate of the thyristor 9 is connected to a first end of a resistor 10. A series circuit of a reed switch 11 and a resistor 12 is connected between the anode of the thyristor 9 and a second end of the resistor 10.

Figure 7:
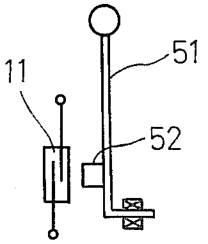
FIG. 7 shows a reed switch actuated by a magnet, exemplifying a position-responsive switch incorporated in the safety device.

The reed switch 11 is employed as a position-responsive switch and is adapted to be closed only when the transmission is in neutral. An example of a device for actuating the reed switch in response to the condition of the transmission is shown in FIG. 7. The reed switch 11 is positioned adjacent to an operating lever 51 of a speed change gear. A magnet 52 is affixed to the lever 51, and is in the closest position to the reed switch when the lever 51 is moved to the neutral position, so that the reed switch 11 is closed in such a condition.

It will be appreciated that the reed switch 11 may be replaced by any of other position-responsive switches, such as a mechanically operated limit switch actuated by physical engagement with a tab or a projection affixed to the lever 51.

A capacitor 13 is connected between the second end of the resistor 10 and the cathode of the thyristor 9, to be charged by a voltage drop across the gate and cathode of the thyristor 9 and to provide a trigger signal to the gate of the thyristor 9.

A first end of the signal coil 7 is connected to the second end of the exciter coil 6. A second end of the signal coil 7 is connected to the cathode of a diode 14, whose anode is connected to an input terminal 15*a* of a waveform shaping circuit 15, whose output terminal 15*b* is connected to the gate of the thyristor 4.

The shaping circuit 15 comprises a resistor 16 connected between the output terminal 15*b* and the ground, a capacitor 17 having a first terminal connected to the output terminal 15*b* and having a second terminal connected to the input terminal 15*a*, a thyristor 18 having its anode grounded and having its cathode connected to the second terminal of the capacitor 17, a resistor 19 connected across the gate and the cathode of the thyristor 18, and a Zener diode 20 having its anode and cathode respectively connected to the gate and the anode of the thyristor 18. Thus the output of the signal coil 7 is applied across the capacitor 17 through the diode 14 and the resistor 16, to charge the capacitor 17 to the Zener voltage of the Zener diode 20, when the resultant conduction of the Zener diode 20 leads to conduction of the thyristor 18, and hence discharge of the capacitor through the gate and cathode of the thyristor 4 and through the anode and cathode of the thyristor 18, thereby triggering the thyristor 4.

The shaping circuit 15 is used to produce a pulsative signal, and it should be noted that this shaping circuit may be omitted and the output of the signal coil 7 may be applied directly but through a rectifying diode to the gate of the thyristor 4.

Among the components mentioned above, the thyristor 9, the resistors 10, 12, the capacitor 13 and the reed switch 11 form the safety device.

Suppose that the transmission is in gear before the engine is started. The reed switch 11 is open indicative of the condition of the transmission in gear.

If initial rotation is given to the engine and hence to the generator by means of a starting device, for instance by pulling a starting rope, the generating windings 6 and 7 produces AC voltages. The positive output, as indicated by the arrow, positively bias the thyristor 9. But, the reed switch 11 does not permit application of a trigger signal from the power source to the gate of the thyristor 9. Also, it is to be understood that the capacitor 13 is not charged since the engine has not been operating and the thyristor 9 has not been conductive.

If the transmission is neutral and the generator is given initial rotation, the positive output from the exciter coil 6 charges the capacitor 13, and trigger the thyristor 9 which is then positively biased. The resultant conduction of the thyristor 9 permits a current to flow through the capacitor 3 and the primary winding 1*a*, so that the capacitor 3 is gradually charged. During the conduction of the thyristor 9, the capacitor 13 is further charged to a voltage corresponding to the voltage drop across the gate and the cathode of the thyristor 9.

Subsequently, negative outputs are produced by the exciter coil 6 and the signal coil 7, and a current flows through the resistor 16, the capacitor 17 and the diode 14, so that the capacitor 17 is charged to a polarity indicated by "+" and "−". When the terminal voltage of the capacitor 17 reaches a sufficient value, the Zener diode 20 conducts and the thyristor 18 is triggered. The resultant conduction of the thyristor 18 discharges the capacitor 17 through the resistor 16. The voltage drop across the resistor is of a pulsative waveform and is applied to the gate of the thyristor 4. The thyristor 4, being positively biased by the capacitor 3, is turned on and discharges the capacitor 3 through the primary winding. A high voltage is induced in the secondary winding 1*b* and the spark plug 2 is fired.

Once the capacitor 13 is charged, it can provide a trigger signal to the thyristor 9, so that the thyristor 9 is turned on whenever the exciter coil 6 positively biases the thyristor 9, and the conduction of the thyristor 9 keeps the capacitor 13 charged. Accordingly, the ignition circuit successively produces a high voltage and the engine is thereby started. When such condition is established, shifting of the transmission into gear, which causes the reed switch to open, does not prevent conduction of the thyristor 9, and therefore the ignition circuit continues its operation.

Figure 2:
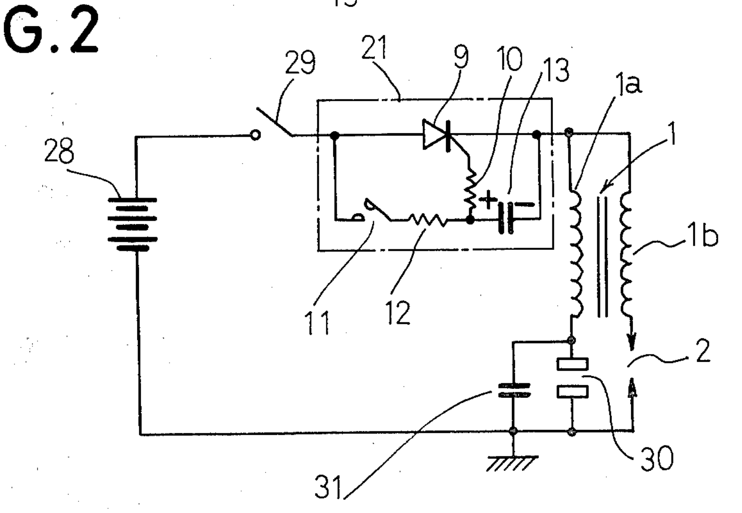

FIG. 2 shows a different type of an ignition circuit associated with a safety device 21 similar to that of FIG. 1. The ignition circuit of FIG. 2 includes a breaker 30 mechanically operated in time with the rotation of the engine. One of the contacts of the breaker 30 is grounded and the other contact of the breaker 30 is connected to a first end of the primary winding 1*a*. A second end of the primary winding 1*a* is connected to the cathode of a thyristor 9 of the safety device 21. The anode of the thyristor 9 is connected through a starting switch 29 to a positive terminal of a battery 28. The negative terminal of the battery 28 is grounded. The secondary winding 1*b* of the ignition coil has one end connected to the second end of the primary winding, and has the other end connected to one of the electrodes of the spark plug 2 having the other electrode grounded. A capacitor 31 is connected in parallel with the breaker 30 to protect the breaker contacts and to provide a path for the current which flows through the spark plug 2, the secondary winding 1*b* and the primary winding 1*a*, when the spark plug 2 is fired.

With the starting switch 21 being closed, and with initial rotation being given to the engine to close the breaker 30, if the transmission is in neutral, the reed switch 11 being closed permits application of a triggering signal to the thyristor 9 and the resultant conduction allows a current to flow through the primary winding 1*a* and the breaker 30. As the engine is rotated further, the breaker 30 is opened and the resultant interruption of the primary current induces a high voltage in the secondary winding 1*b*. As the breaker 30 is opened, the thyristor 9 is turned off, but the capacitor 13 is charged, so that the capacitor 13 maintains a condition wherein the thyristor 9 is turned on when the breaker 30 is subsequently closed. As a result, the transmission can be shifted into gear without disabling conduction of the thyristor 9.

Figure 3:
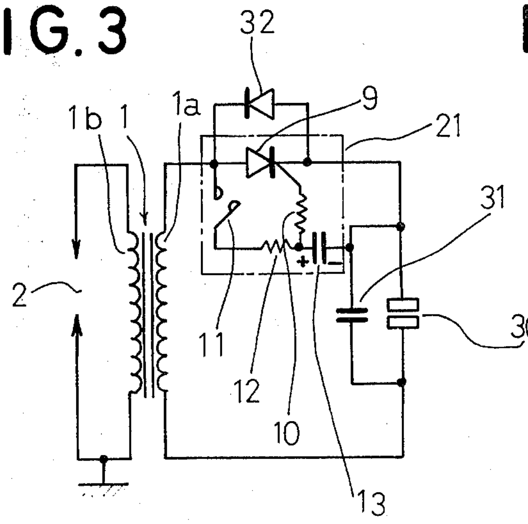

FIG. 3 shows an ignition circuit wherein at least the primary winding 1*a* of the ignition coil 1 is disposed in an AC generator to serve as the power supply of the ignition circuit and also as the power supply of the safety device 21. A breaker 30, similar to that of FIG. 2, is connected through the thyristor 9 of the safety device 21, similar to that of FIG. 2, across the primary winding 1*a*. A capacitor 31 is connected in parallel with the breaker 30. A diode 32 has its anode and cathode respectively connected to the cathode and anode of the thyristor 9 to permit a current to flow when the primary winding 1*a* produces a voltage of a negative polarity.

As the engine is rotated, the primary winding 1*a* produces an AC voltage. When the breaker 30 is closed, a current flows through the primary winding 1*a* provided however the thyristor 9 is in a condition in which it can be turned on either because the reed switch 11 is closed or the capacitor 13 is charged.

Figure 4:
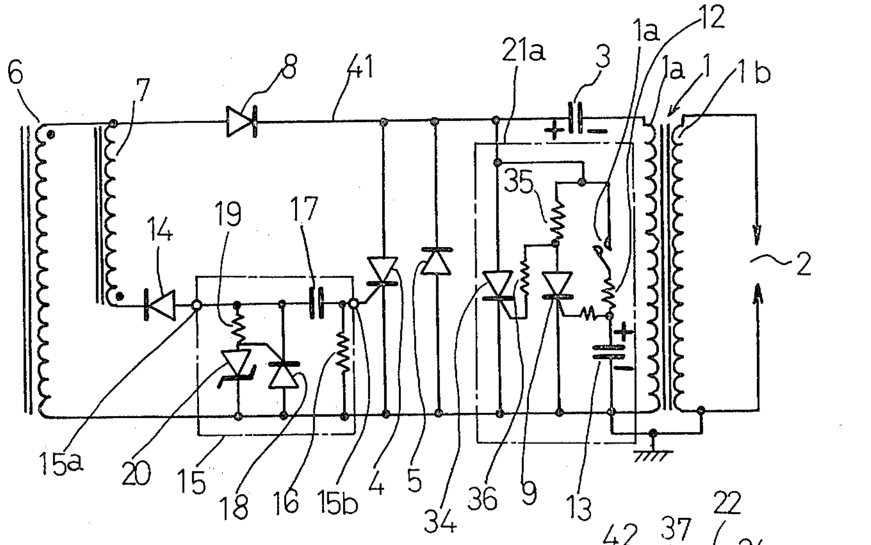

FIG. 4 shows an ignition circuit substantially similar to that of FIG. 1, except that the second terminal of the capacitor 3 is directly connected via a lead 41 to the cathode of the diode 8. A safety device 21*a* shown in FIG. 4 includes a thyristor 9 having its anode connected through a resistor 35 to the lead 41. The gate of the thyristor 9 is connected to a first end of a resistor 10. A series circuit of a reed switch 11 and a resistor 12 is connected between the lead 41 and a second end of the resistor 10. A capacitor 13 is connected between the second end of the resistor 10 and the cathode of the thyristor 9. The anode of the thyristor 9 is connected through a resistor 36 to the gate of a second thyristor 34. The anode of the second thyristor 34 is connected to the lead 41 and the cathode of the second thyristor 34 is grounded.

If the thyristor 9 is in a condition in which, with positive bias thereacross, it can be turned on either because the reed switch 11 is closed or because the capacitor 13 is sufficiently charged, then the gate of the thyristor 34 is effectively shorted, so that conduction of the thyristor 34 is prevented. In this condition, the capacitor 3 is charged and discharged in a manner similar to that described with reference to FIG. 1.

If the thyristor 9 does not conduct even when it is positively biased (because the transmission is not in neutral at the start of the engine), the thyristor 34 is turned on by receiving a trigger signal through the resistors 35, 36. The conducting thyristor 34 shorts out the series circuit of the capacitor 3 and the primary winding 1*a* and prevents charging of the capacitor 3. Consequently, the capacitor 3 is not capable of providing a discharge current even when the thyristor 4 is triggered, and hence the ignition coil does not produce a high voltage.

Figure 5:
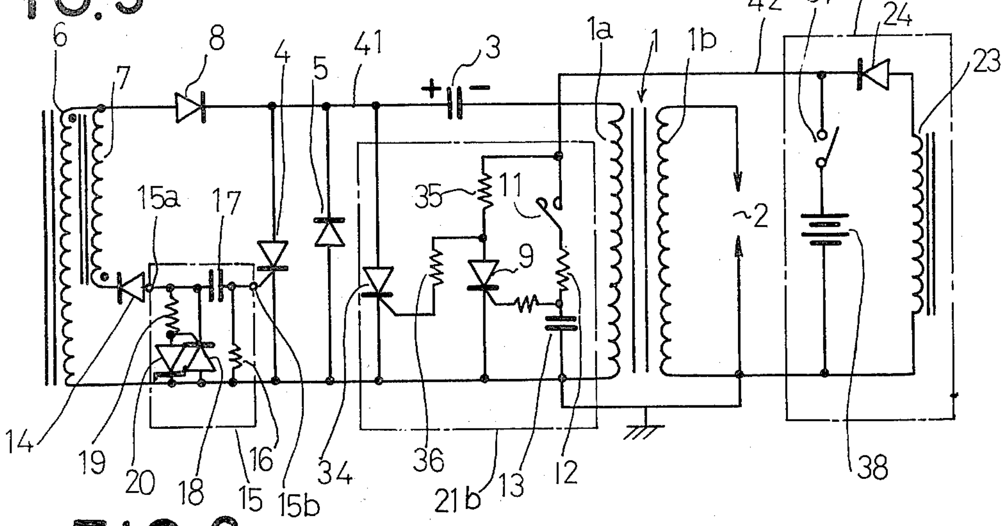

FIG. 5 shows an ignition circuit similar to that of FIG. 4. A safety device 21*b* employed is similar to that of FIG. 4, except that it is provided with a separate power supply 22. The power supply 22 comprises a generating winding 23 having one end grounded and having the other end connected to the anode of a diode 24, whose cathode is connected to a lead 42. There is also provided a battery 38 having its negative terminal grounded and having its positive terminal connected through a switch 37 to the lead 42. The anode of the thyristor 9 is connected through a resistor 35 to the lead 42. The series circuit of the reed switch 11 and the resistor 12 has one end connected to the lead 42. The operation of the circuit is substantially similar to that of FIG. 4.

Figure 6:
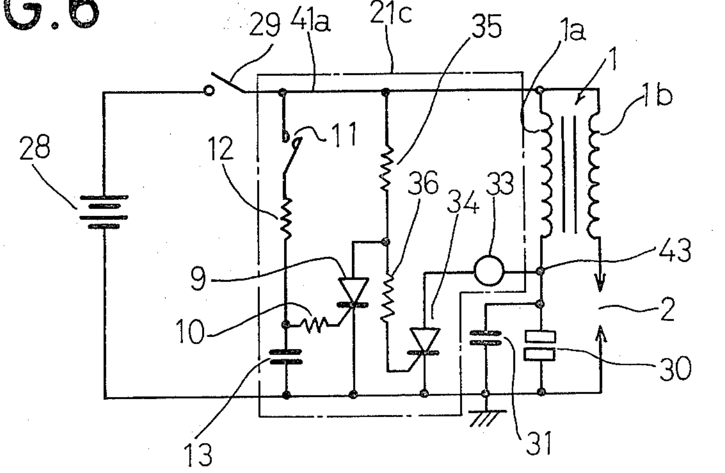

FIG. 6 shows an ignition circuit similar to that of FIG. 2, except that the second end of the primary winding 1*a* is connected via a lead 41*a* and through a switch 29 to a positive terminal of a battery 28. A safety device 21*c* is similar to that of FIG. 4 except as described below. A thyristor has its anode connected through a resistor 35 to a lead 41*a*. A series circuit of a reed switch 11 and a resistor 12 has one end connected to the lead 41*a*. A second thyristor 34 has its anode connected through an indicater such as a pilot lamp 33 to a junction 43 connecting the primary winding 1$a$ and the breaker 30.

If a condition is established wherein the thyristor 9 is turned on whenever it is positively biased, the second thyristor 34 is prevented from conduction. Accordingly, the ignition circuit can operate in a manner substantially as described with reference to FIG. 2. If the above-mentioned condition is not achieved, the second thyristor 34 is turned on to short out the breaker 30, thereby making ineffective make-and-break operation of the breaker 30, with the result that the ignition circuit does not produce a high voltage. The pilot lamp indicates that the thyristor 34 is conducting and the transmission is in a state wherein it is not acceptable to start the engine.

As examples of ignition circuit, two types of ignition circuits are illustrated, one type having a thyristor to discharge a capacitor through the primary winding and the other type having a breaker to allow and interrupt a current through the primary winding. It is however noted that the safety device hereinabove described may be adapted to any type of ignition circuits, including those wherein one of other kinds of electronically controlled switches such as a transistor is used in place of the thyristor to discharge the capacitor through the primary winding, those wherein an electronically controlled switch is used in place of the breaker to allow and interrupt a current through primary winding, and those wherein a breaker or an electronically controlled switch is connected in parallel with a primary winding.

In the various examples illustrated, the power supply may be in any form. Those examples employing a battery as a power supply may be so modified that they are powered by an exciter coil, and those examples employing an exciter coil as a power supply may be so modified that they are powered by a battery. Also, the primary winding of FIG. 4 also acting as a power supply may be incorporated in other examples, so that a separate exciter coil or a separate battery may be eliminated.

The thyristor 9 may be adapted in various ways. All that is necessary is that the thyristor 9 is adapted to render ineffective the operation of at least one of the circuit components which contribute to the operation of the ignition circuit of producing a high voltage. Apart from the examples illustrated, the thyristor 9 may be adapted to render ineffective the operation of a signal source determining the ignition timing. The thyristor 9 may be adapted directly control such a circuit component or it may control an auxiliary thyristor which in turn controls such a circuit component.

A position-responsive switch is illustrated as being a reed switch. A Hall element or a Hall IC (integrated circuit) may also be used in substitution for the reed switch. A mechanically-operated limit switch may also be used, and in that case a magnet is not needed but a physical engagement means is used to actuate the limit switch.

While there have been described what are at present considered to be the preferred embodiments of this invention, it will be obvious to those skilled in the art that various changes and modifications may be made therein without departing from the invention, and it is aimed, therefore, in the appended claims to cover all such changes and modifications as fall within the true spirit and scope of the invention.

What is claimed is:

1. A safety device for controlling an ignition circuit for an internal combustion engine associated with a transmission coupling the engine to a load, the ignition circuit including a power supply and at least one ignition coil having a primary and a secondary winding producing a high voltage to fire a spark plug provided in the engine, said safety device comprising:

a thyristor adapted to permit the ignition circuit to produce the high voltage only when said thyristor is conductive, a position-responsive switch, resistor means connecting said switch across the anode and the gate of said thyristor to permit the application of a trigger signal from said power supply to the gate of said thyristor only when the transmission is in neutral, and a capacitor connected through said resistor means across the gate and the cathode of said thyristor to be charged by a voltage drop across the gate and the cathode of said thyristor and to provide a trigger signal to the gate of said thyristor, whereby once said capacitor is charged it maintains a condition wherein said thyristor is turned on whenever said thyristor is positively biased even after the transmission is shifted into gear.

2. A safety device as set forth in claim 1, wherein the ignition circuit includes a power supply, and said power supply of said safety device also serves as the power supply of the ignition circuit.

3. A safety device as set forth in claim 1, wherein said position-responsive switch is adapted to be closed to couple the gate of said thyristor to said power supply only when the transmission is in neutral.

4. A safety device as set forth in claim 1, wherein the ignition circuit includes a second capacitor adapted to be charged, and discharging means for discharging the second capacitor through the primary winding, and said thyristor is adapted to prevent charging of the second capacitor when said thyristor is non-conducting.

5. A safety device as set forth in claim 1, wherein the ignition circuit includes switching means connected in series with the primary winding to switch on and off the primary current, said safety device includes a second thyristor connected in parallel with the switching means, and said first thyristor is adapted to prevent conduction of said second thyristor when said first thyristor is conducting.

6. A safety device for controlling an ignition circuit for an internal combustion engine associated with a transmission coupling the engine to a load, the ignition circuit comprising a power supply and a discharge control circuit including at least one ignition coil having a primary and a secondary winding producing a high voltage to fire a spark plug provided in the engine, a capacitor adapted to be charged by the power supply, and a semiconductor switch for discharging said capacitor through a primary winding of the ignition coil, said safety device coupled between the power supply and the discharge control circuit and comprising:

a thyristor connected between the power supply and the discharge control circuit so as to permit the ignition circuit to produce the high voltage only when said thyristor is conductive, a position-responsive switch, resistor means connecting said switch across the anode and the gate of said thyristor to permit application of a trigger signal from said power supply to the gate of said thyristor only when the transmission is in neutral, and a capacitor connected through said resistor means across the gate and the cathode of said thyristor to be charged by a voltage drop across the gate and the cathode of said thyristor and to provide a trigger signal to the gate of said thyristor, whereby once said capacitor is charged it maintains a condition wherein said thyristor is turned on whenever said thyristor is positively biased even after the transmission is shifted into gear.

7. A safety device for controlling an ignition circuit for an internal combustion engine associated with a transmission coupling the engine to a load, the ignition circuit including a DC supply, at least one ignition coil having a primary and a secondary winding producing a high voltage to fire a spark plug provided in the engine, and a breaker connected in series with said primary winding of the ignition coil, said safety device coupled between said DC supply and the series circuit of the primary winding and the breaker, and comprising:

a thyristor connected between the DC supply and the series circuit of the primary winding and the breaker so as to permit the ignition circuit to produce the high voltage only when said thyristor is conductive, a position-responsive switch, resistor means connecting said switch across the anode and the gate of said thyristor to permit application of a trigger signal from said DC supply to the gate and the cathode of said thyristor only when the transmission is in neutral, and a capacitor connected through said resistor means across the gate and the cathode of said thyristor to be charged by a voltage drop across the gate and the cathode of said thyristor and to provide a trigger signal to the gate of said thyristor, whereby once said capacitor is charged it maintains a condition wherein said thyristor is turned on whenever said breaker closes in time with the rotation of the engine even after the transmission is shifted into gear.

8. A safety device for controlling an ignition circuit for an internal combustion engine associated with a transmission coupling the engine to a load, the ignition circuit including at least one ignition coil having a primary winding disposed in a generator by the engine and serving as a power supply and having a secondary winding, and a breaker connected across said primary winding, said safety device coupled between the primary winding and the breaker and comprising:

a thyristor connected between the primary winding and the breaker so as to permit the ignition circuit to produce the high voltage only when said thyristor is conductive, a position-responsive switch, resistor means connecting said switch across the anode and the gate of said thyristor to permit application of a trigger signal from said primary winding of the ignition coil to the gate of said thyristor only when the transmission is in neutral, and a capacitor connected through said resistor means across the gate and the cathode of said thyristor to be charged by a voltage drop across the gate and the cathode of said thyristor and to provide a trigger signal to the gate of said thyristor, whereby once said capacitor is charged it maintains a condition wherein said thyristor is turned on whenever said thyristor is positively biased and said breaker closes in time with the rotation of the engine even after the transmission is shifted into gear.

9. A safety device as set forth in any one of claims 6, 7 or 8, wherein said capacitor is connected through a resistor across the gate and the cathode of said thyristor.

* * * * *